United States Patent
Derleth et al.

(12) 
(10) Patent No.: US 6,731,028 B2
(45) Date of Patent: May 4, 2004

(54) ELECTRIC MACHINE WITH IMPROVED COOLING FEATURE

(75) Inventors: Erhard Derleth, Grosswenkheim (DE); Klaus Greubel, Bad Neustadt (DE); Klaus Happel, Wollbach (DE); Bruno Heim, Grosseibstadt (DE); Felix Ludwig, Bad Kissingen (DE); Thomas Niklaus, Roadelmaier (DE); Jochen Pecher, Heustreu (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/957,677

(22) Filed: Sep. 20, 2001

(65) Prior Publication Data

US 2002/0135245 A1 Sep. 26, 2002

(30) Foreign Application Priority Data

Mar. 23, 2001 (DE) .......................... 101 14 321

(51) Int. Cl.$^7$ ................................ H02K 9/00
(52) U.S. Cl. ........................... 310/52; 310/64
(58) Field of Search ..................... 310/52, 54, 58, 310/64, 87, 42

(56) References Cited

U.S. PATENT DOCUMENTS

| | | | | |
|---|---|---|---|---|
| 3,123,729 A | * | 3/1964 | Fagel | 310/43 |
| 3,688,137 A | * | 8/1972 | Filhol | 310/43 |
| 3,719,436 A | * | 3/1973 | McFarlin | 417/356 |
| 4,517,479 A | * | 5/1985 | Aleem et al. | 310/54 |
| 5,459,190 A | * | 10/1995 | Nakamura et al. | 524/443 |
| 5,532,533 A | * | 7/1996 | Mizutani | 310/68 B |
| 5,886,433 A | * | 3/1999 | Oda et al. | 310/59 |
| 6,181,038 B1 | * | 1/2001 | Van Rooij | 310/89 |
| 6,201,321 B1 | * | 3/2001 | Mosciatti et al. | 310/43 |
| 6,222,289 B1 | * | 4/2001 | Adames | 310/54 |
| 6,445,095 B1 | * | 9/2002 | Liang et al. | 310/64 |

FOREIGN PATENT DOCUMENTS

| | | |
|---|---|---|
| DE | PS 864 900 | 1/1953 |
| DE | Os 16 13 297 | 3/1971 |
| DE | 196 51 959 A1 | 6/1998 |
| EP | 0 915 554 A2 | 5/1999 |

* cited by examiner

Primary Examiner—Burton S. Mullins
Assistant Examiner—Nguyen Hanh
(74) Attorney, Agent, or Firm—Henry M. Feiereisen

(57) ABSTRACT

An electric machine, includes a stator with a laminated stator body having winding end portions potted in a cast, and a rotor for interaction with the stator. In order to cope with the increased heat development in the zone of the winding end portions compared to the zone of the stator body, the cast of the winding end portions is formed with surface-enlarging structures in heat-conducting contact with a cooling jacket or with a cooling medium, and/or the cast is provided at least partially with a heat-conducting envelope which carries off heat.

12 Claims, 2 Drawing Sheets

ELECTRIC MACHINE WITH IMPROVED COOLING FEATURE

CROSS-REFERENCES TO RELATED APPLICATIONS

This application claims the priority of German Patent Application, Serial No. 10114321.4, filed Mar. 23, 2001, the subject matter of which is incorporated herein by reference.

BACKGROUND OF THE INVENTION

The present invention relates to an electric machine of a type having a stator with laminated stator body, rotor and potted winding end portions.

European Pat. No. EP 0 915 554 A2 describes an electric motor which includes a stator without housing and with a laminated stator body of rotation-symmetric configuration. The stator body has cooling slots which are located on the slot-distal side of the stator body and receive cooling conduits for conduction of a cooling medium. Winding end portions axially extend out of the stator, whereby a heat-conducting plastic material connects the cooling conduits with the stator body and the winding end portions.

This electric motor suffers shortcomings because the cooling conduits are connected with the winding end portions by a heat-conducting plastic casting material in a single operation. This has to be taken into account during fabrication. Before casting, the cooling conduits may be slightly damaged. Furthermore, the cooling device is used for cooling the laminated stator body as well as for the winding end portions. This lack of discrimination is disadvantageous because it fails to take into account the desired increased need for heat dissipation in the area of the winding end portions.

It would therefore be desirable and advantageous to provide an improved electric machine to obviate prior art shortcomings and to enhance a cooling of the winding end portions while yet simplifying fabrication.

SUMMARY OF THE INVENTION

According to one aspect of the present invention, an electric machine, includes a stator with a laminated stator body having winding end portions encased in a casting material that forms a cast, a rotor for interaction with the stator, and an arrangement for carrying away heat generated by the electric machine, with the arrangement including surface-enlarging structures formed on the surface of the cast and/or a heat-conducting envelope which is, at least partially, provided upon the cast.

Surface-enlarging structures in the cast material of the winding end portions enhance a cooling of the winding end portions and improve the heat dissipation. This is realized through passive cooling by means of convection and/or active cooling by means of gaseous or liquid cooling media, which carry off heat though their volume flow. In addition, enclosing the cast for the winding end portion with a heat-conducting envelope can further enhance cooling of the winding end portion.

Further advantageous configurations for providing an improved cooling of the winding end portion through a heat-conducting encasement may be realized through combination of surface-enlarging structures with a heat-conducting envelope of winding end portions. Heat-conducting envelopes of potted winding end portions bear at least partially upon the casting material. The heat-conducting envelope is made of a highly heat-conducting material which, unlike the heat-conducting casting material, may also be electrically conducting. Examples of highly heat-conducting material include in particular metals, such as copper, aluminum or iron, or metal alloys.

Heat-conducting envelopes are capable to direct heat from regions that are difficult to reach by active coolants, such as gases and/or liquid, to regions that are more accessible. For example, heat can be carried away from the zone of the inner radius area of the potted winding end portion or also from the region at the end face of the potted winding end portions. Establishing a contact of the envelope with a cooling fluid can optimize heat dissipation by means of a heat-conducting envelope. With air-cooling, the heat dissipation is suitably implemented by a combination of cooling air stream and cooling body. In the event, cooling with liquid is desired, the heat-conducting envelope should have contact with a liquid-cooled body.

Surface-enlarging structures should be so configured as to allow the fabrication of a negative mold as well as a positive mold—negative impression and positive impression—that can easily be fabricated. Preferred are wavy, triangular, pyramid-like structures or combinations thereof. Mold design requirements should hereby be taken into account.

Suitably, the electric machine is provided with laminated stator body, rotor, potted winding end portions formed by conductors, and casting material with cooling channels for conduction of a coolant, whereby the cooling medium absorbs heat from the winding end portions, with the heat being carried away across surface-enlarging structures of the cast. The surface-enlarging structures may be of the macroscopic type as well as microscopic type. Crucial is only the heat-conducting contact area. In the event, cooling channels are disposed in a cooling jacket or in cooling slots of a laminated stator body, a surface-enlarging structure may be implemented by the cooling jacket itself or by the material which forms the cooling slots.

According to another feature of the present invention, the overall cooling system is so configured as to provide a higher degree of cooling of the winding end portions compared to the cooling of the stator body. Such a targeted or discriminating cooling action takes into account different temperature development in the winding end portions, i.e. in the zone, of the winding end portions, and in the zone of the stator body. In particular, when highly exploited indirect water-cooled machines are involved, the temperature at the winding end portions is substantially higher than the temperature in the stator body, thereby forming the basis for the recognition to provide a better cooling action in the area of the winding end portions. An enhanced cooling action may be realized through denser, i.e. closer, arrangement of cooling channels. Moreover, the cooling channels may not only be arranged two-dimensional in a plane in side-by-side disposition but can also be arranged three-dimensional in staggered disposition. As a consequence of the increased cooling action in the area of the winding end portions, an uneven heat distribution is offset and the motor can be better exploited according to the thermal classes. Example of cooling systems include air cooling, liquid cooling or gas cooling, which can each be suited to the requirements at hand.

Another feature of the present invention involves the utilization of heat-conducting envelopes for heat transport and improved cooling of the winding end portions. Heat-conducting envelopes of potted winding end portions bear at least partially upon the cast, and may be made of a highly heat-conducting material, which unlike the heat-conducting casting material may also be electrically conducting. Examples include in particular metals, such as copper, aluminum or iron, or metal alloys.

Heat-conducting envelopes are capable to guide heat from regions that are difficult to reach by active coolants, such as gases and/or liquid, to regions that are more accessible. For example, heat can be carried away from the zone of the inner radius area of the potted winding end portion or also from the region at the end face of the potted winding end portions. The heat conduction is routed to conventional cooling devices such as air-cooling or liquid cooling.

The heat transport by means of a heat-conducting envelope can be optimized through contact of the envelope with a cooling assembly. Examples of a cooling assembly include the cooling jacket or the formed part having the cooling slots in which the cooling channels, e.g. cooling conduits, are incorporated.

Just as the cast for encasing the winding end portions may have surface-enlarging structures, it is also conceivable to provide the heat-conducting envelope with surface-enlarging structures. The configuration of such surface-enlarging structures can be best suited to the type and scope of the cooling action and in particular can be shaped in dependence on the desired cooling action. In particular, when active cooling is involved, e.g., cooling air flow or cooling water, the heat-conducting envelope may be formed with surface-enlarging structures such as wavy profiles, wedged profiles or combinations thereof.

When taking into account the different heat fluxes to be carried away, the components for conducting the heat flow may have a cross section that is sized in dependence with the magnitude of the heat flow to be carried off. In the event, a heat-conducting envelope is routed across the inner radius of the casting material and contacts the end face of the cast, the heat flow to be carried off is increased.

Suitably, the heat flow to be carried off is guided in the enlarged cross section of the components to a cooling assembly. As a consequence of the greater cross sectional area, a greater contact area can be established with an active component of the cooling system or active component for cooling, such as a cooling jacket.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
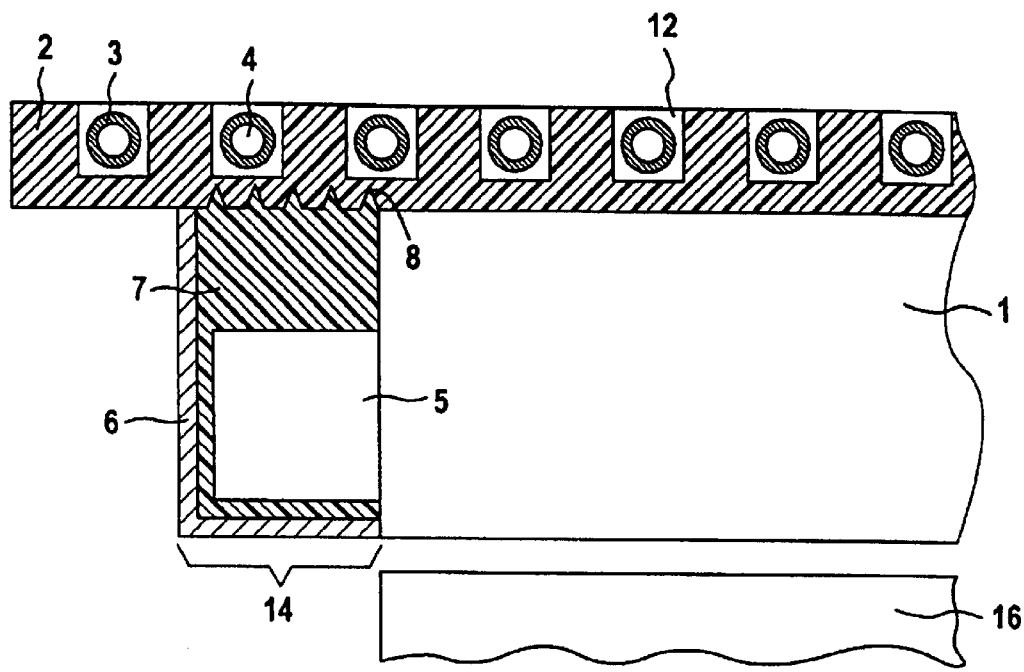
FIG. 1 is a schematic partially sectional view of one embodiment of an electric machine according to the present invention.

Throughout all the Figures, same or corresponding elements are generally indicated by same reference numerals.

Turning now to the drawing, and in particular to FIG. 1, there is shown a schematic partially sectional view of one embodiment of an electric machine according to the present invention, including a laminated stator body 1 and a cooling jacket 2 resting on the stator body 1 for cooling thereof. The stator body 1 interacts with a rotor 16, shown only schematically, and carries winding end portions 5 respectively jutting out from opposite axial end faces of the stator body 1 (only one end of the stator body 1 is shown here for sake of simplicity). In the non-limiting example of FIG. 1, the cooling jacket 2 extends axially beyond the stator body 1 as well as the zone of the winding end portion 5. Of course, while the overhang of the cooling jacket 2 represents merely a currently preferred configuration, because of an improved cooling action and provision of a mechanical protection of the area of the winding end portion, the present invention should certainly not be limited thereto.

Figure 3:
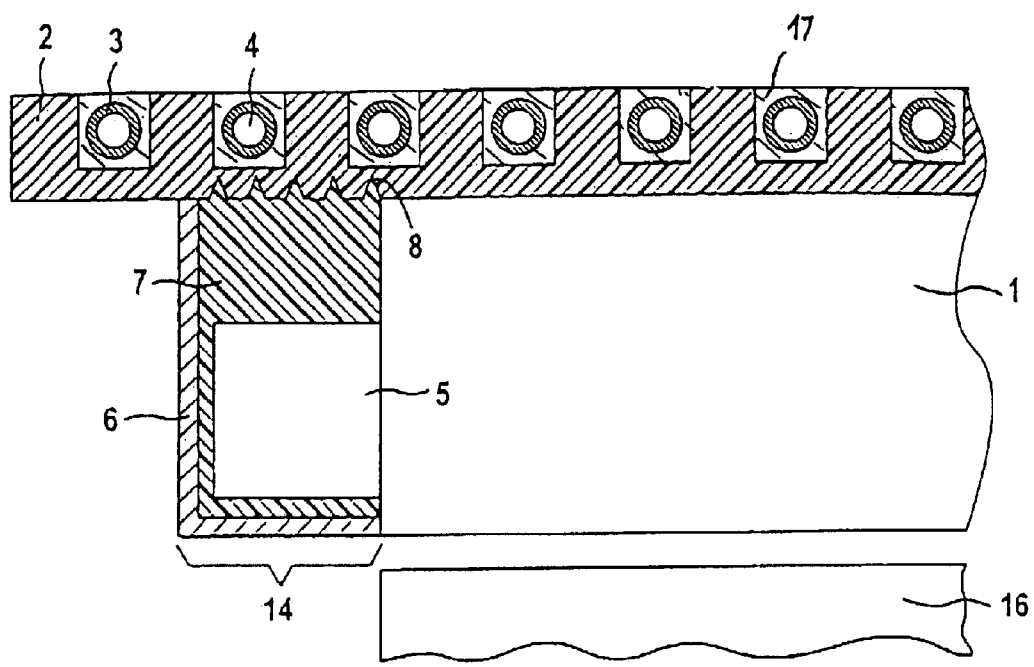

The cooling jacket 2 is formed interiorly with cooling slots 12. In the non-limiting example of FIG. 1, the cooling slots 12 are shown to have a rectangular configuration. While this rectangular configuration may be advantageous in the context of fabrication through a milling operation, the present invention is, of course, not limited to this configuration, as other configurations such as round or elliptic shapes, are certainly also conceivable and should be covered by this disclosure. The cooling slots 12 may be fully embedded in the cooling jacket 2 and thus closed so as to directly receive and guide a cooling medium 4, such as air or liquids, e.g. water, de-ionized water, or oil or other suitable fluids. FIG. 1 shows, however, an exemplified embodiment in which the cooling slots 12 have incorporated therein cooling channels 3 for conduct ion of the cooling medium 4. The cooling channels 3 are shown to have a round profile, which can be made more cost-efficient. Although not shown, the cooling slots 12 may, in this case, also have a round configuration in order to establish a maximum contact area between cooling jacket 2 and cooling channel 3. In order to facilitate a heat transfer between cooling jacket 2 and cooling channel 3, it may be suitable to embed the cooling channels 3 in a heat-conducting medium 17, disposed between cooling channel 3 and cooling jacket 2, as shown in FIG. 3.

The exemplified illustration in FIG. 1 shows radial cooling channels 3 which may or may not follow a spiral-like pattern. Of course, the cooling jacket 2 may also be provided instead with axial cooling channels 3, without departing from the principles described in the following description with respect to the implemented cooling actions. Heat generated in the stator body 1 is transferred to the cooling jacket 2 across the interface between the stator body 1 and the cooling jacket 2 and from there carried away by the cooling medium 4 circulating in the cooling channels 3.

Heat generation in the zone of the winding end portions 5 is significant. Accordingly, the winding end portions 5 (only one is shown in FIG. 1) are each encased in a cast 7 of heat-conducting material, for example, plastic material such as casting resin. Thus, heat generated by the winding end portions 5 is conducted initially to the cast 7 and subsequently dissipated via the boundary surfaces of the cast 7. An improvement of the heat dissipation is realized through enlarging the surface area of the boundary surfaces of the cast 7. As shown in FIG. 1, this may be implemented by forming the cast 7 at the interface with the confronting cooling jacket 2 with notch-like wedge-shaped protrusions 8 which are received in complementary pockets of the cooling jacket 2. In this way the cooling surface between the cast 7 and the cooling jacket 2 is increased, thereby taking into account the need for greater cooling action in the area of the winding end portion 5.

Increasing the speed by which heat is carried away can further enhance the cooling of the cast 7. This concept is implemented by providing a heat-conducting envelope 6 which is made of highly heat-conducting material, e.g. metals, such as copper, aluminum or iron, or metal alloys. As shown in FIG. 1, the potted winding end portion 5 is encased by the envelope 6 which bears upon the cast 7 and extends from the end face of the stator body 1 along the inner radius zone 14 and end at the confronting side of the cooling jacket 2. The provision of the envelope 6 effects in particular a cooling action in those regions which are located distal to the cooling jacket 2 and are otherwise only difficult to cool. The envelope 6 has a substantially constant cross section in the non-limiting example of FIG. 1.

As a consequence of the arrangement of the winding end portions 5, a ring-shaped structure with inner radius and outer radius is formed. In particular the inner radius zone 14 is only difficult to reach regardless whether the cooling medium 4 is involved or a cooling action is provided on the basis of cooling air. By providing the heat-conducting envelope 6, heat can now be carried away more rapidly from the inner radius zone 14 as well as from other regions that need to be cooled for transfer to the cooling medium 4. In FIG. 1, the transfer of heat is effected hereby across the interface between the heat-conducting envelope 6 and the cooling jacket 2. Although not shown in detail in FIG. 1, it is, of course, also possible to provide the envelope 6 with surface-enlarging structures to enhance the cooling effect, in particular in those situations in which a transfer of heat from the envelope 6 to the cooling jacket 2 is barred. The configuration of such surface-enlarging structures of the envelope 6 can be suited to the type and scope of the cooling action and in particular can be shaped in dependence on the desired cooling action. In particular, when active cooling is involved, e.g., cooling air flow or cooling water, the heat-conducting envelope 6 may be formed with surface-enlarging structures such as wavy profiles, wedged profiles or combinations thereof.

Figure 2:
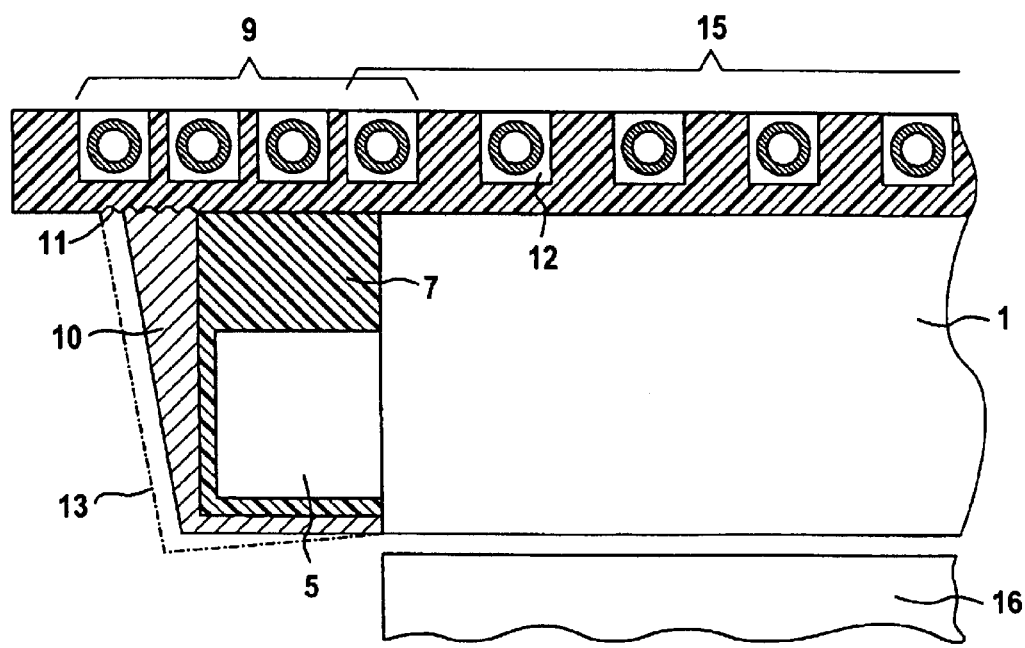
FIG. 2 is a schematic partially sectional view of another embodiment of an electric machine according to the present and FIG. 3 is a schematic partially sectional view of vet another embodiment of an electric machine according to the present invention.

Turning now to FIG. 2, there is shown another embodiment of an electric machine according to the present invention. Parts corresponding with those in FIG. 1 are denoted by identical reference numerals and not explained again. In this embodiment, the overall cooling system in the area of the winding end portion 5 is modified. The cooling jacket 2 has a distinct cooling zone 9 for the winding end portion 5, whereby the cooling zone 9 is characterized by a denser arrangement of the cooling slots 12 with the cooling channels 3 and cooling medium 4 so as to enhance the heat dissipation in the cooling zone 9 compared to the cooling zone 15 for the stator body 1. The winding end portion 5 is potted in cast 7, and the cast 7 is enclosed by a heat-conducting envelope 10 which has a section of constant cross section in the area of the inner radius zone 14 and a progressively increasing cross section in the direction from the inner radius zone 14 toward the cooling jacket 2. Since the amount of heat rises as the interface between the envelope 10 and the cast 7 increases in size, a variable configuration of the envelope 10 can be suited to the situation at hand to improve dissipation of heat. A greatest cross sectional area is provided at the interface between the envelope 10 and the cooling jacket 2. In general, the cross section at the interface should be greater than the minimum cross section. Analog to the envelope 6, the envelope 10 may be made of highly heat-conducting material, e.g. metals, such as copper, aluminum or iron, or metal alloys.

Suitably, the interface between the envelope 10 and the cooling jacket 2 is formed with surface-enlarging structure, e.g. in the form of a wavy zone 11. Of course, the illustration of the wavy zone 11 is only exemplary, as any other surface-enlarging configurations are conceivable as well, such as e.g. triangular shape, pyramid-like shape, combinations thereof or other suitable configurations. It is to be understood by persons skilled in the art that it is certainly also conceivable to provide such surface-enlarging structures between the cast 7 and the heat-conducting envelope 10 and/or between the cast 7 and the cooling jacket 2, as shown by way of example in FIG. 1. It will be further understood by the skilled artisan that the proportional cross sectional enlargement of the envelope 10, as shown in FIG. 2, should be considered as an exemplified configuration, as other configurations are, of course, also conceivable. The principles described in the description with respect to the envelope 10, as shown in FIG. 2, are equally applicable to any other type of configuration of the envelope, so long as the different heat generation is taken into account. Another option may be, for example, a stepped configuration of the envelope 10.

As indicated by dash-dot line 13 in FIG. 2, the envelope 10 may also be so constructed as to exhibit a cross sectional enlargement in the inner radius zone 14 to further improve the heat dissipation and thus cooling effect in the area of the inner radius zone 14.

FIGS. 1 and 2 show various possibilities to implement an improved cooling in the zone of the winding end portion 5. Of course, the artisan will suit the cooling system to the situation at hand so that combinations of features, shown in the drawing are conceivable. Any combination of wedge surfaces 8, denser disposition of cooling slots 12 in the cooling zone 9, wavy surfaces 11 and appropriate configuration of envelopes 6, 10, 13 form part of the present invention and are considered to be covered by this disclosure. Although not shown, it is also conceivable to provide cooling channels in the cast 7 and/or the winding end portion 5 to improve the cooling action.

While the invention has been illustrated and described as embodied in an electric machine, it is not intended to be limited to the details shown since various modifications and structural changes may be made without departing in any way from the spirit of the present invention.

What is claimed as new and desired to be protected by Letters Patent is set forth in the appended claims:

What is claimed is:

1. An electric machine, comprising:
   a stator including a laminated stator body having a winding end portion potted in a casting material which forms a cast;
   a rotor for interaction with the stator;
   a cooling jacket in heat-conducting contact with the stator;
   a heat-conducting envelope, at least partially, enclosing the cast; and
   means for carrying away heat generated by the electric machine, said means including a plurality of axially spaced protrusions extending from the envelope into the cooling jacket.

2. The electric machine of claim 1, wherein the cooling jacket includes cooling channels for conduction of a cooling medium, wherein the cooling channels are provided in one of direct heat-conducting contact with the cooling jacket, and indirect heat-conducting contact with the stator via the cooling jacket.

3. The electric machine of claim 2, wherein the cooling jacket is provided for cooling a zone of the winding end portion and a zone of the stator body, and so configured that a greater cooling action is effected in the zone of the winding end portion than in the zone of the stator body.

4. The electric machine of claim 3, wherein the cooling channels in the zone of the winding end portion are arranged in denser relationship than in the zone of the stator body.

5. The electric machine of claim 2, wherein the means for carrying away heat is so configured as to increase in cross section in dependence on the magnitude of heat flow to be carried off.

6. The electric machine of claim 5, wherein the heat flow to be carried off is routed via the means for carrying away heat to the cooling jacket.

7. The electric machine of claim 1, wherein the protrusions have a wedge-shaped configuration.

8. The electric machine of claim 1, wherein the protrusions have a configuration selected from the group consisting of triangular shape, wavy shape, pyramidal shape, and combinations thereof.

9. The electric machine of claim 1, wherein the envelope is made of a material selected from the group consisting of metal and metal alloys.

10. The electric machine of claim 9, wherein the metal is selected from the group consisting of copper, aluminum, and iron.

11. The electric machine of claim 1, wherein the envelope has a variable cross section.

12. The electric machine of claim 1, wherein the envelope has a L-shaped configuration with an inner radius zone of constant cross section and a progressively increasing cross section in a direction from the inner radius zone toward the cooling jacket.

* * * * *